Aug. 18, 1970   J. POMAGALSKI ET AL   3,524,626
HOIST
Filed Dec. 11, 1967                      2 Sheets-Sheet 1

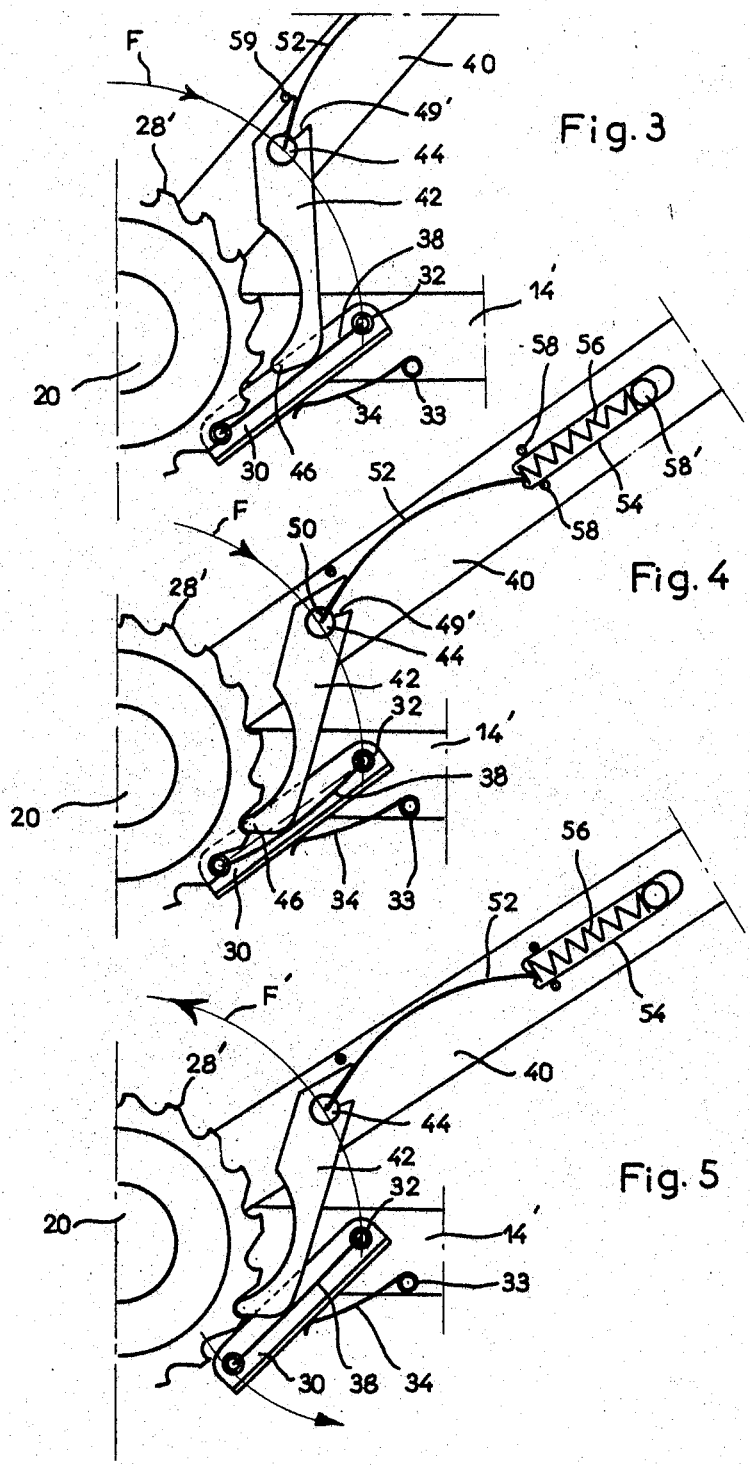

United States Patent Office 3,524,626
Patented Aug. 18, 1970

3,524,626
HOIST
Jean Pomagalski, La Tronche, and Marcel Durand, Grenoble, France, assignors to Jean Pomagalski S.A.
Filed Dec. 11, 1967, Ser. No. 689,369
Claims priority, application France, Dec. 28, 1966, 5,034
Int. Cl. B66d 1/00
U.S. Cl. 254—167                    2 Claims

ABSTRACT OF THE DISCLOSURE

A hoist comprising a frame in which is so fitted that it may rotate a pulley with a groove for the hauling of a cable passing through the groove, an operating lever with which the pulley is intermittently rotated by means of an operating pawl articulated on the said lever and coacting with the notches of a ratchet wheel fixed to the said pulley, the notches also coacting with a holding pawl which prevents the rotation backwards of the said pulley, elastic means being provided to maintain in one buckled position the operating pawl disengaged from the ratchet wheel and in the other buckled position in the engaged position.

---

The invention relates to hoists comprising a frame in which is fitted so that it may rotate, a grooved pulley or sheave for hauling a cable passing through the groove, an operating lever for the intermittent rotation of the grooved sheave by means of an operating pawl articulated on the lever and coacting with ratchet teeth locked with the grooved pulley, the said ratchet teeth coacting also with a holding pawl which prevents retrograde movement of the grooved pulley.

A primary object of the invention is to simplify considerably the elastic means provided to force the operating pawl into an inactive position to permit the lowering, notch by notch, of a load connected with the cable, and to force this pawl into an active position to permit the raising of the said load. According to the invention, the said elastic means consists of a plate or flat spring engaged in one end of the said pawl and maintained yielded, the said plate spring providing also the force pulling the said pawl towards the said ratchet teeth after inversion of the direction in which it is bent.

Another object of the invention is the provision in addition to the usual elastic means which force the holding pawl into the active position of a plate or flat spring locked with the holding pawl, and on which the free end of the operating pawl acts during the lowering operation.

According to a development of the idea of the invention, the said plate spring is housed in the interior of the holding pawl with the advantages that the plate spring is thus efficiently protected and the operating pawl can engage itself below and inside the holding pawl without any risk of being displaced laterally.

Further objects and advantages of the present invention will be aparent from the following description, reference being had to the accompanying drawings, wherein preferred embodiments of the present invention are clearly shown.

In the annexed drawing:

FIG. 3 shows the position of the pawls when the operating pawl has just engaged itself below the holding pawl, to lower the load;

FIG. 4 shows the position of the pawls an instant later when the operating pawl has engaged itself with a ratchet tooth without provoking the disengagement of the holding pawl;

FIG. 5 shows the position of the pawls yet an instant later when the operating pawl has been subjected to the effort required to make the pulley turn backwards, the holding pawl then being freed for a short period.

Figure 1:
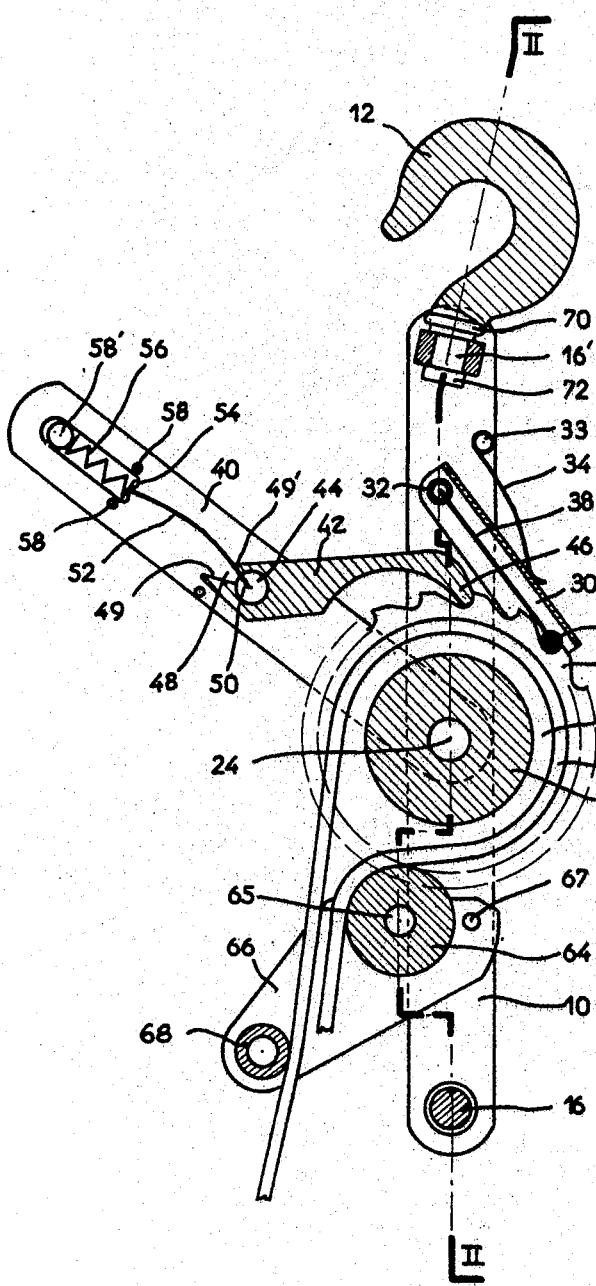
FIG. 1 is an axial section of a hoist according to the invention, ready to haul a load.
Figure 2:
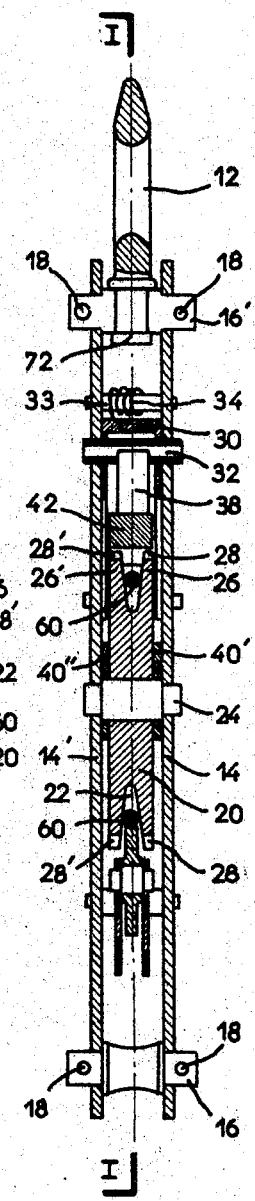
FIG. 2 is a section along the dotted line II—II of FIG. 1.

In the hoist of these figures, a yoke-shaped frame 10 may be hung or fixed by means of a hook 12 articulated in some way on frame 10. The side-plates of the frame consist of two steel flats 14, 14' which are connected at their ends by two shafts 16, 16' which pass through side-plates 14, 14' and are maintained in position by pins 18. A pulley 20 with V-groove 22 can rotate freely on an axle 24 which passes through side-plates 14, 14' of frame 10. The two flanks 26, 26' of the V-groove 22 of pulley 20, which are of appropriate thickness, each have notches or teeth 28, 28' so as to form a monobloc whole consisting of two ratchet wheels 28, 28', located on each side of the pulley 20 proper, the whole being of a weight definitely lower than that of the usual juxtaposed elements. The teeth 28, 28' of pulley 20 are of cylindrical form at the bottom and form a housing for the pawls. A holding pawl 30 is articulated on an axle 32 which passes through side-plates 14, 14' of frame 10 and to which is fixed at 33 a plate or flat spring 34 pulling the nose 36 of the holding pawl 30 in the direction of notches 28, 28' of the ratchet wheel. In the example chosen the holding pawl 30 is formed of a piece of steel folded into the form of a U, through the flanks of which pass two axles 32 and 36, the axle or nose 36 being intended to coact with the ratchet wheels by engaging in the cylinder-shaped part of notches 28 28', the other axle 32 which projects on each side of pawl 30 and passes through the side-plates 14, 14', forming the axle on which pawl 30 is articulated. Between axles 32 and 36 is inserted according to the invention the plate or flat spring 38 one end of which is engaged in a slot made in axle 36 and the other end in a similar slot in axle 32.

An operating lever 40 comprising two side-plates 40', 40'', rotates about the same centre as pulley 20 and is articulated on axle 24 of pulley 20.

An operating pawl 42 is fitted on an axle 44, passing through side-plates 40', 40'' of lever 40, and can engage ratchet wheels 28, 28'. The nose of pawl 42 is semi-cylindrical, and of a length equal at least to the width of the grooved pulley 20 so that it can engage itself in the corresponding cylindrically shaped part of notches 28, 28' in the two ratchet wheels. It should be noted that the great width of grooved pulley 20 permits a particularly stable symmetrical pressure of the pawls 42 and 30 which do not have any tendency to move sideways.

The other end of pawl 42 has a notch 48 with lips 49, 49' in the form of a V extending in depth to the articulation axle 44 which is grooved at 50 as far as the centre to receive one end of a plate or flat spring 52 which, according to the invention is maintained in a buckled position for preference by a slide 54 which receives the other end of plate spring 52 and is subject to the pressure of a compression spring 56, which presses the slide 54 against plate spring 52 in the direction of axle 44. Slide 54 is guided by pins 58 and 58' and the latter, which passes through operating lever 40 serves as a stop for spring 56. The buckling of plate spring 52 is limited on one side by lip 49' of notch 48 which acts as a stop, the operating pawl 42 then being pulled towards notches 28, 28' of the ratchet wheel, and on the other side by lip 49 of notch 48, plate spring 52 then tending to disengage pawl 42 from the ratchet wheels. To make plate spring 52 pass from one buckled position to the symmetrically opposed buckled position, it suffices to exert manually an effort in the direction that would tend to bring it into a rectilinear position, which is an unstable position, the difference in length between the chord of the spring when buckled and its length in the rectilinear position being compensated by the movement of slide 54 in opposition to spring 56. Another solution consists of the pivoting of axle 44 by means of a knurled knob on the outside of the frame of lever 40, and pinned on to this axle 44. A stop coacting with the stem of pawl 42 limits the buckling in the direction of disengagement. A hauling or lifting cable 60 is placed in the groove 22 of pulley 20, in passing the end under pawls 30 and 42 and through a compression device maintaining cable 60 in groove 22. This compression device can be of any type, and can for example include a wheel subjected to the action of a spring. In the example chosen, this compression device comprises a compression wheel 64 loosely fitted on an axle 65 in a yoke 66 the side plates of which are articulated at 67 on frame 10, and carry a wheel 68 coacting with the taut side of cable 60 in such a way that under the effect of the tension in the cable the compression wheel 64 is pressed into the groove 22 of pulley 20.

The hoist according to the present invention operates in the following manner:

By means of hook 12, frame 10 is attached to a fixed point, and the load (not shown) to the hauling end of cable 60; cable 60 is tautened manually, by sliding it in the groove 22 of pulley 20. This sliding is easily accomplished, compression wheel 64 being disengaged from groove 22 while the cable is not taut. Plate spring 52 of operating pawl 42 is brought into its buckled position shown in FIG. 1 in which it presses against lip 49' of notch 48, thus causing nose 46 of pawl 42 to enter notches 28, 28' of grooved sheave 20. When a to and from movement is applied to the operating lever 40, the operating pawl 42 will cause pulley 20, which pulls cable 60, to turn in the usual way, holding pawl 30 preventing the return movement of pulley 20 during the return travel of operating lever 40.

To lower the load, plate spring 52 is brought into the lowering position illustrated in FIGS. 3 to 5 in which the spring presses against lip 49 of notch 48, thus tending to disengage nose 46 of pawl 42 from notches 28, 28' of pulley 20. Pawl 42 having come away from teeth 28, 28', operating lever 40 is moved in the direction in which a load would be raised (see arrows F on FIGS. 3 and 4) and the end of operating pawl 42 engages under holding pawl 30, coming up against plate spring 38. Holding pawl 30, which is carrying the whole load cannot disengage from notches 28, 28', thanks to the configuration of these, and the prolonged movement of lever 40 results in the buckling of plate spring 38 which pulls operating pawl 42, and obliges it to penetrate notches 28, 28' of pulley 20 (see FIG. 4). The operating lever can then take the load through the intermediary of pawl 42 and holding pawl 30 relieved of its load disengages from the notches under the action of plate spring 38 (see FIG. 5). A movement of operating lever 40 in the opposite direction (see arrow F' in FIG. 5) then provokes the lowering of the load attached to cable 60 and the withdrawal of pawl 42 which disengages from holding pawl 30 and from its plate spring 38. At this moment the holding pawl 30 again penetrates, under the influence of its spring 34, the adjacent notches 28, 28' thus blocking once more the movement backwards of pulley 20 which will be moved one notch at a time. All is then ready for the cycle to commence again, the load thus being lowered notch by notch.

What we claim is:

1. A hoist comprising a frame, a grooved pulley rotatably mounted on the frame, a cable passing in the groove of the pulley, a ratchet wheel fixed to the pulley, a pivotably mounted operating lever, an operating pawl articulated on said lever said point of articulation being above said ratchet wheel, said pawl coacting with the notches of the ratchet wheel, a holding pawl articulated from said frame at a point above said ratchet wheel also coacting with said notches to prevent the rotation backwards of the pulley, a flat spring engaging one end of said operating pawl and maintained under tension by buckling to maintain in one position the operating pawl disengaged from said notches, and when buckled on the opposite side to provide a stress biassing the operating pawl in the operating position towards said notches, a coiled compression spring at the end of said flat spring remote from said operating pawl to bias said flat spring in a buckled position but permit adjustment of said flat spring from one position to the other, a flat spring attached to said holding pawl, whereby the relative position and the relative dimensions of the two said pawls are such that the operating pawl may press its free end against the holding pawl through the intermediary of said flat spring attached to said holding pawl and a holding spring to bias said holding pawl toward said ratchet wheel.

2. Hoist according to claim 1, whereby the holding pawl has a groove in the interior, in which the said flat spring is housed.

References Cited

UNITED STATES PATENTS

| | | | |
|---|---|---|---|
| 2,501,252 | 3/1950 | Anglemyer | 254—167 |
| 2,633,328 | 3/1953 | Wallace | 254—167 |
| 3,003,359 | 10/1961 | Maasdam | 254—167 |
| 3,163,400 | 12/1964 | Skerry | 254—167 |

HARVEY C. HORNSBY, Primary Examiner

U.S. Cl. X.R.

254—147, 175.5